United States Patent Office 3,500,988
Patented Mar. 17, 1970

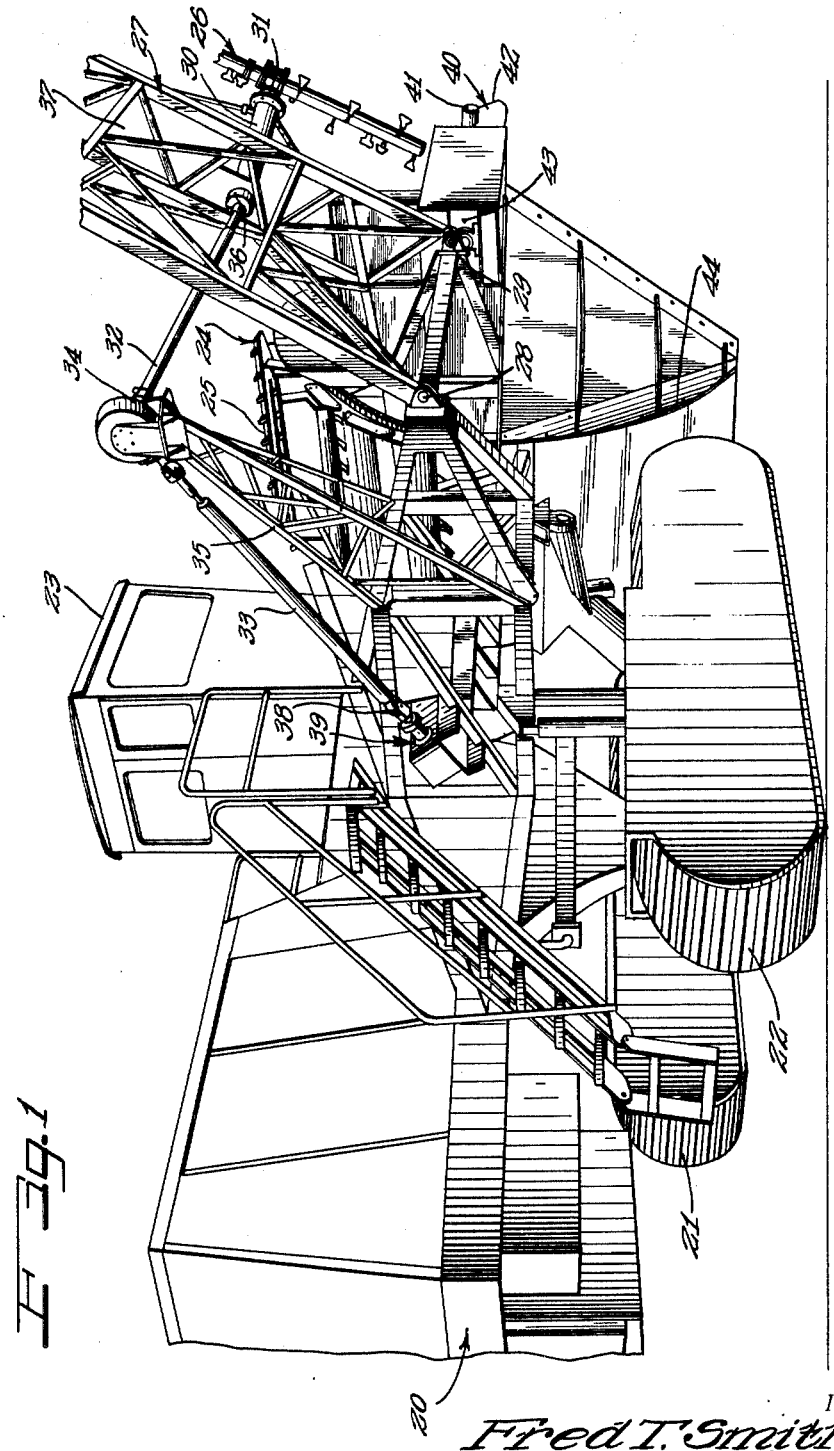

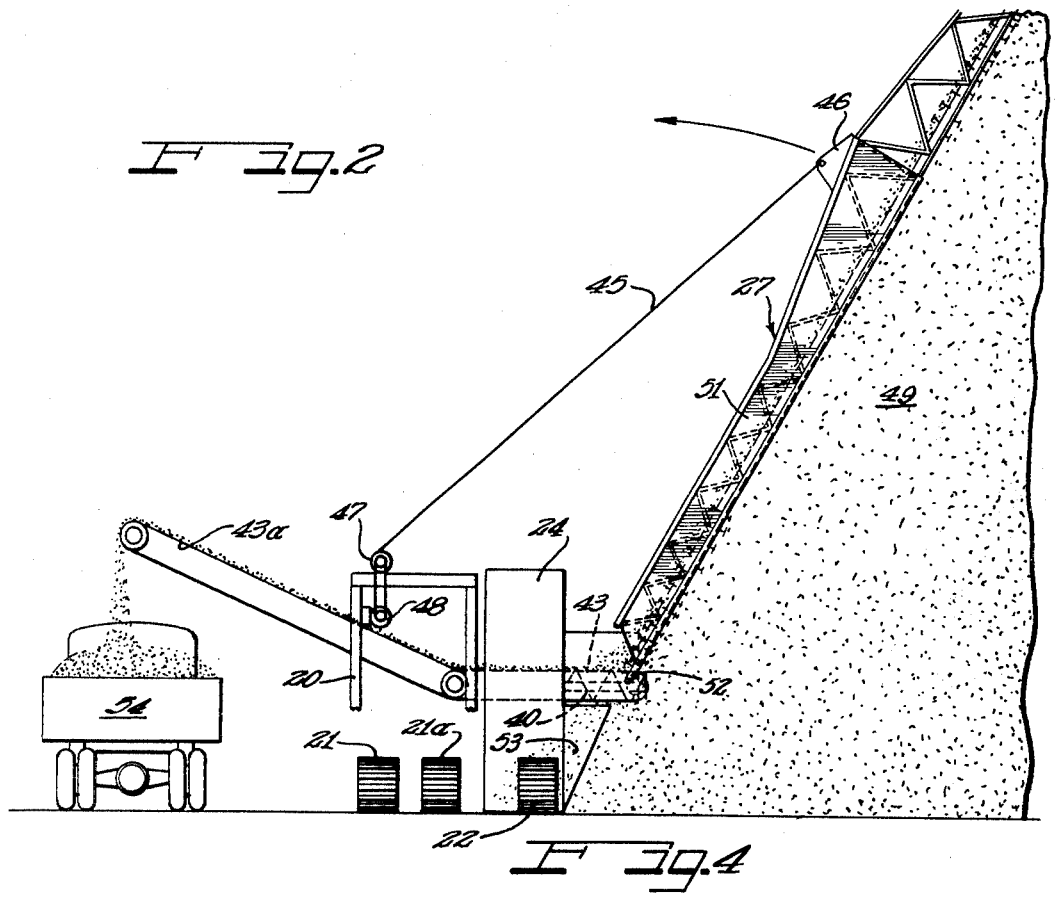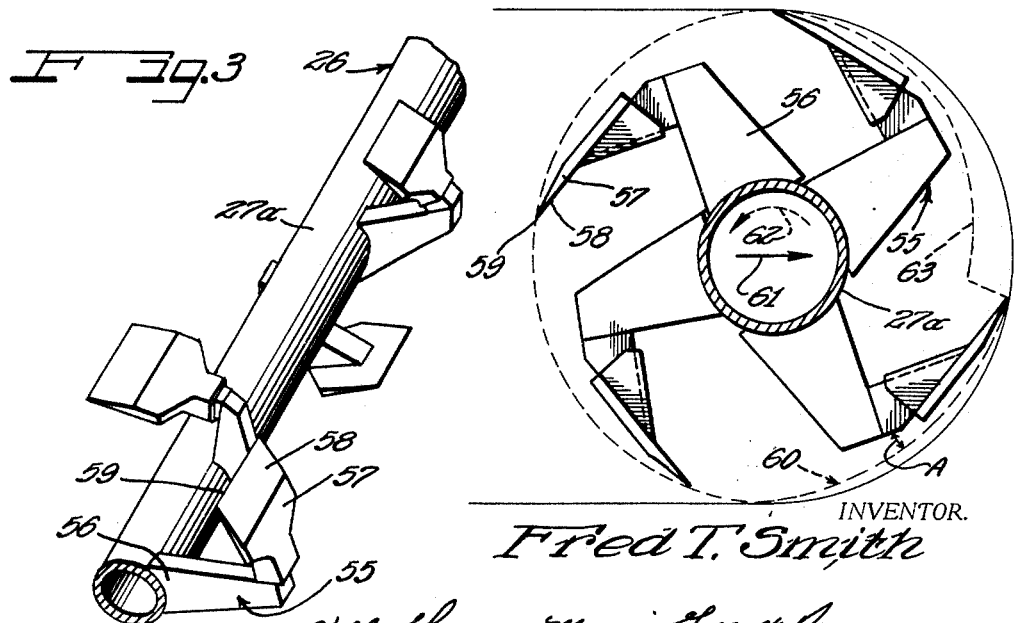

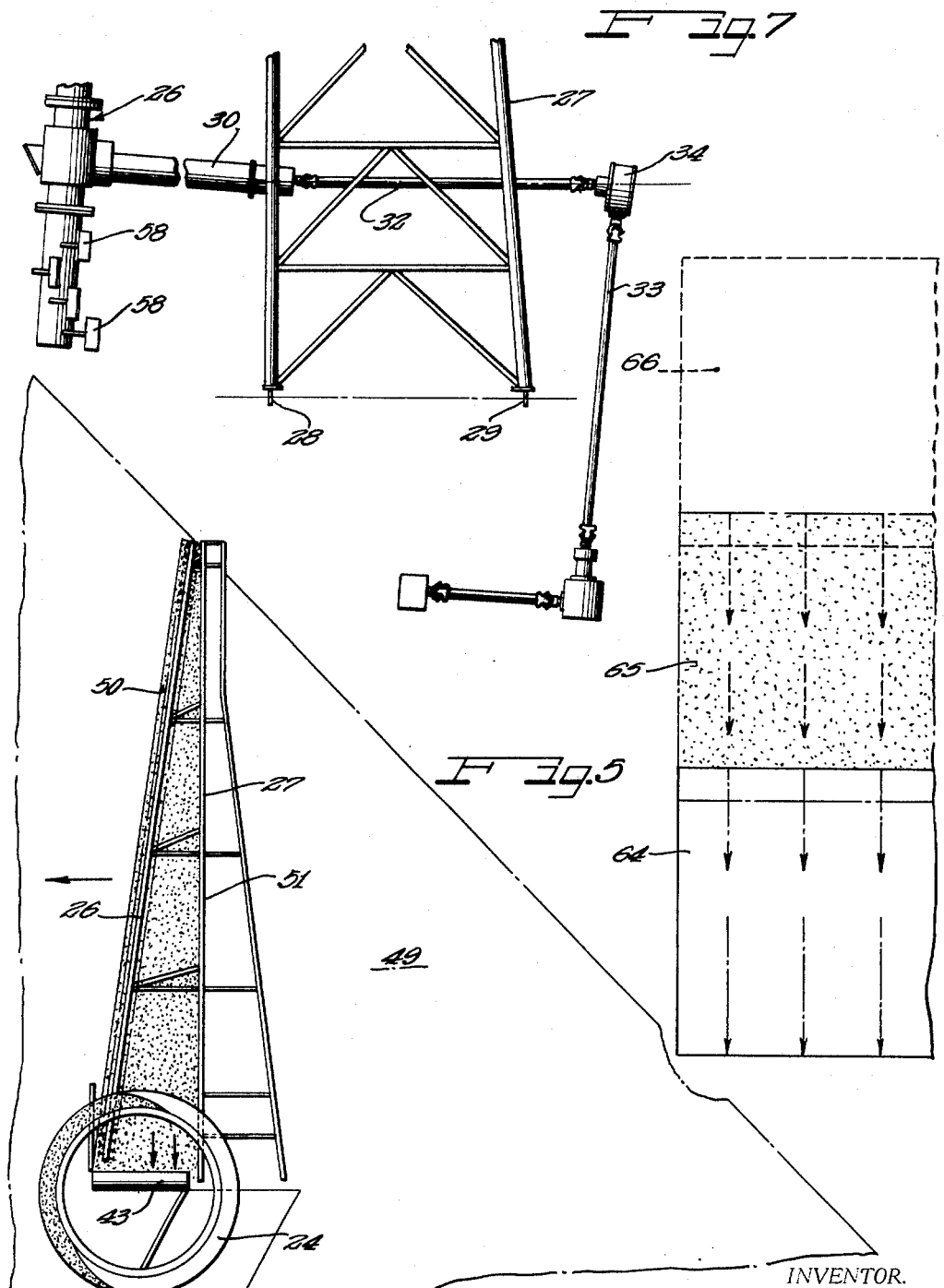

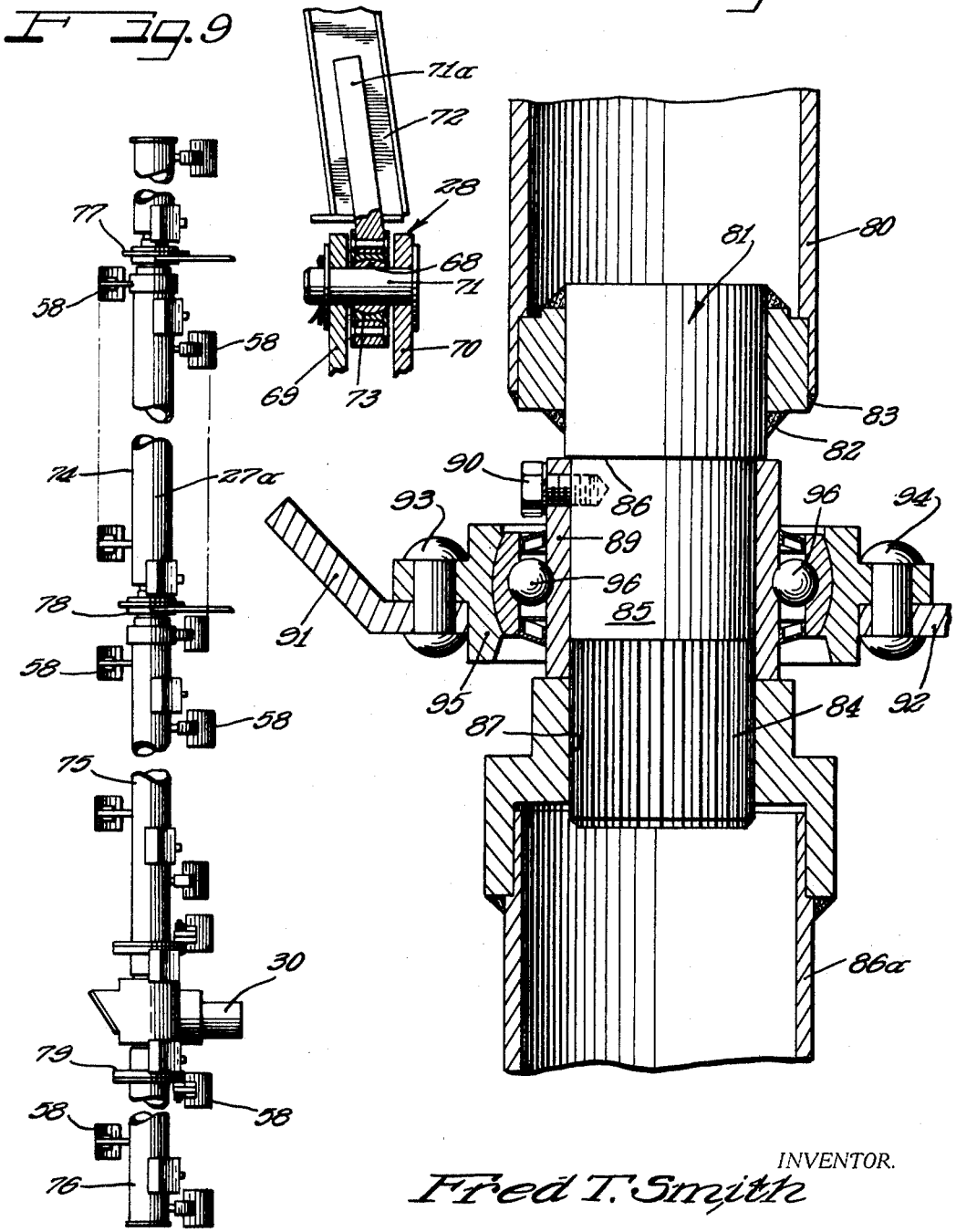

3,500,988
WHEEL RECLAIMER AND ITS CUTTERS
Fred T. Smith, Aurora, Ill., assignor to Barber-Greene Company, Aurora, Ill., a corporation of Illinois
Continuation-in-part of application Ser. No. 504,739, Oct. 24, 1965. This application Apr. 6, 1966, Ser. No. 540,715
Int. Cl. B65g 65/28
U.S. Cl. 198—36                                    23 Claims

ABSTRACT OF THE DISCLOSURE

This invention concerns a reclaimer having as a component, a sloper for resting on a pile of reclaimable material in a plane extending generally transversely of the longitudinal plane of the reclaimer and the path of travel of the reclaimer. The reclaimer and its sloper are provided to move alongside the pile, while the sloper cuts into the surface thereof at elevated points for releasing a stream of material onto a cross conveyor. The reclaimer also utilizes a circular type digging wheel mounted at one side thereof, and the conveyor is extended transversely through the digging wheel for carrying material from the wheel to a loading receptacle.

---

The present application is a continuation in part of my copending patent application Ser. No. 504,739 entitled "Reclaimer," filed on Oct. 24, 1965, now abandoned.

This invention relates to a material handling device and in particular to a material or reclaimer having a rotary sloper cutter for engaging the surface of a pile of reclaimable material and for depositing loosed material on to a conveyor for ultimate movement to a loading receptacle.

According to a principal object of the present invention, the sloper cutter of the reclaimer device extends upwardly and transversely from the digging wheel and employs a plurality of cutting blades for slicing material from the surface of a reclaimable pile.

Another object of this invention is to provide a sloper cutter which is disposed at the leading edge of a supporting boom and which engages the surface of a pile of reclaimable material for creating a steady stream of that material onto a conveyor system.

It is also an object of this invention to provide a sloper cutter having a plurality of cutting blades which are spaced longitudinally along the length of a sloper shaft and which are positioned angularly about that shaft in the form of a substantial helix.

It is another object of this invention to provide a sloper cutter for a reclaimer device which employs a plurality of chisel-like cutting blades spaced radially outwardly from a cutting shaft and orientated for slicing a layer of material from the surface of a reclaimable pile.

Another object of this invention is to provide a sloper cutter for a reclaimer device including a plurality of cutting blades having a cutting edge disposed substantially longitudinally along the length of the cutting shaft and wherein all points on the cutting blade are spaced radially inwardly of the cutting edge.

It is a further object of this invention to provide a boom for a sloper cutter of a reclaimer device which boom is pivotally mounted at the frame of the reclaimer and wherein the drive shaft for actuating the sloper cutter is supported at a universal joint and extended substantially parallel to the pivot points of the sloper boom.

These and other objects, features and advantages of the present invention will be understood in greater detail from the following description and the associated drawings wherein reference numerals are utilized in designating a preferred embodiment and wherein:

FIGURE 1 is an elevated view of a reclaimer device employing the pivotally supported boom and sloper cutter of this invention and illustrating the relationship of the drive shaft and the digging wheel of the reclaimer device;

FIGURE 2 is a schematic representation of the operation of a reclaimer device according to this invention and in particular of the operation of the sloper cutter apparatus;

FIGURE 3 is an elevated view of a section of the sloper cutter shaft showing the orientation of the discrete cutter blades thereon;

FIGURE 4 is an end view of the sloper cutter shaft shown in FIGURE 3, illustrating the manner by which the cutting blades engage the surface of a reclaimable pile and showing a vector diagram of the combined motion experienced by the cutter blades of this invention;

FIGURE 5 is a pictorial representation showing a surface portion of a reclaimable pile having been engaged by the sloper cutter of this invention and illustrating the downward movement of loosed material created by the operation of the helically positioned cutting blades;

FIGURE 6 is a diagrammatic representation of the sloper cutter and associated boom of this invention illustrating the movement of loosed material from the surface of the pile to the cross conveyor and showing the relationship of the digging wheel relative to both the sloper cutter and the cross conveyor;

FIGURE 7 is an elevated view of a portion of the sloper cutter and the drive shaft and linkages as disposed relative to an associated portion of the pivotally mounted boom;

FIGURE 8 is a sectional view of the pivotal support provided for the sloper boom of this invention;

FIGURE 9 is an elevational view of the sloper cutter showing the union of a series of discrete cutter segments combined to form the total cutter length of this invention, and FIGURE 10 is a sectional view showing the means of attachment of the sloper cutter shaft to the supporting boom of the reclaimer machine.

This invention concerns generally the use of a longitudinal shaft having a plurality of cutting blades for loosening the surface of a pile of reclaimable material. The cutting shaft is orientated alongside the upwardly extending surface of the pile, and the reclaimer machine is moved forward, while the cutting shaft is rotated about its axis.

The cutting blades are mounted on the rotating shaft for performing a chisel-like action in response to the rotation thereof. Furthermore, the forward movement of the shaft enhances or lengthens the cut developed by the cutting blades and in effect generates a cycloidal cutting path along the surface of the reclaimable pile. In addition, the cutting blades are disposed about the cutting shaft in such a manner as to enhance the downward movement of the loosed material. In this way, the material being cut does not interfere with successive cutting actions.

The reclaimer itself consists of a supporting frame 20 which is carried on two rear crawlers 21 and 22 and on a forward extending crawler 21a (FIGURE 2). The reclaimer is powered for forward movement and the entire machine operation may be controlled from a cab 23.

The reclaimer machine has a digging wheel 24 which is rotatably positioned within the plane of movement of the entire machine. A series of buckets 25 are provided at the periphery of the digging wheel 24, such that rotation of the wheel 24 causes loosed material deposited at the ground level to be shovelled into the buckets for being eventually elevated to a level for being carried from the reclaimer machine to a loading receptacle.

A second digging or cutting device, namely the sloper cutter 26, is associated with the reclaimer of this invention. The sloper 26 is supported on a sloper boom 27 which is a latticework structure and which is pivotally mounted to the frame 20 at points 28 and 29. The boom 27 is pivotally mounted at the points 28 and 29 to allow adjustment of the sloper cutter 26 relative to different sized and different shaped material surfaces.

A drive shaft 30 connects to the sloper cutter 26 at a point 31 and is actuated by a series of linkages 32 and 33 which are mounted at a universal joint 34 supported on a cantilever strut 35. The linkage 32 is also supported at a point 36 within a wall 37 of the boom 27. Also, the linkage 33 is supported at a universal joint 38 at a gearbox 39.

A third cutting device of the reclaimer machine of this invention is an auger 40 which is disposed substantially parallel to the axis of the digging wheel 24. The auger 40 is essentially a screw mounted on a shaft 41 and having a cutting edge 42 for engaging the surface of a reclaimable pile. The auger 40 is positioned directly adjacent to the lower end of the sloper cutter 26 and cuts a path to clear the conveyor portion which extends beyond the digging wheel.

In addition to the three cutting tools of the reclaimer of this invention, a conveyor 43 is deployed substantially along the axis of the rotating digger 24 for receiving loosed material from the various cutting instruments. In particular, the rotating buckets 25 of the digging wheel 24 empty loose materials gathered from the ground level onto the upper surface of the conveyor 43. Likewise, material loosed by the action of the sloper cutter 26 fall along the path provided by the boom 27 and the surface of the reclaimable pile and are received substantially onto the surface of the conveyor 43. Loosed material which by-passes the conveyor such as material which is loosed by the action of the auger 40 or material which falls unpredictably from either the sloper 26 or the digging wheel 24 is scooped back into the path of the digging wheel 24 by a baffle or scoop 44.

Considering the sloper of the reclaimer device in greater detail, it is shown in FIGURE 2 that the angle of the sloper and associated boom support is determined by a supporting cable 45 which is connected to a flange 46 secured in turn to the boom 27 and which is also connected through a pulley mechanism 47 and 48 to the power system of the reclaimer machine. Through the use of the cable support 45 and due to the pivotal mounting 28 and 29 of the boom 27, the sloper assembly can be caused to rest against the surface of a pile of reclaimable material 49 as shown in FIGURE 2.

Referring to FIGURE 6 in conjunction with FIGURE 2, it is shown that the sloper 26 is orientated to be rotated at the leading edge of the boom assembly 27. The sloper 26 engages a cut edge 50 of the reclaimable pile 49 and material loosed from the action of the sloper cutter is caused to fall between the cut edge 50 and a dam or baffle 51 which is formed along the length of the boom 27. Effectively, a trough is provided between the cut edge 50 and the dam 51 to confine the flow of loosed materials in a predictable manner toward the upper surface of the conveyor 43. As shown in FIGURE 2, the auger 40 is disposed directly beneath the lower edge 52 of the sloper 26 and provides a path or opening for the progressive movement of the conveyor 43 which must extend beneath the sloper 26 to gather the maximum quantity of loosed materials therefrom. As also shown in FIGURE 2, loosed materials 53 which fall from the sloper 26 and which manage to by-pass the conveyor 43 are deposited within the rotating digging wheel 24 for being eventually elevated to the upper surface of the conveyor 43. The conveyor 43 may extend appreciably outwardly from the reclaimer machine in the form of an extension 43a which is elevated sufficiently above ground level for depositing a steady stream of reclaimed material onto a loading receptacle such as a truck 54a or the like.

A portion of the sloper cutter shaft itself is shown in FIGURE 3 isolated from the working environment of FIGURE 2. The sloper 26 comprises a shaft 27a and a plurality of cutter blades 55. The cutter blades have a blade support 56 fixedly mounted to the outer surface of the shaft 27a and a chisel-like blade portion 57 fixedly mounted to the blade support 56 and orientated at a substantial right angle thereto. The blades 57 have a tapered face 58 extending from a cutting edge 59. Successive blades are spaced longitudinally along the length of the shaft 27a and are angularly positioned thereabout to form a substantial helical pattern.

The cutting action of the cutting blades 55 is illustrated in FIGURES 4 and 5. FIGURE 4 is an end view of the cutting shaft shown in FIGURE 3 and illustrates the orientation of the cutting blades 55 relative to the surface 60 of the reclaimable pile 49. The motion of the cutting blades 55 is illustrated by the arrows 61 and 62 shown at the center of the cutting shaft 27a. The arrow 61 indicates the longitudinal movement of the shaft as it is carried by the reclaimer machine alongside the surface of the pile 49, while the arrow 62 designates the rotation of the cutting blades 55 about the shaft 27a. The combined movements indicated by the arrows 61 and 62 result in a cycloidal cutting path 63 at the edge 60 of the pile 49. It should be noted in FIGURE 4 that all points on the cutting blades 55 are spaced inwardly of the cutting edge 59 for providing clearance between the outer surface of the blade and the cut surface 60 of the pile 49. Such clearance is designated by the letter $a$ in FIGURE 4.

The manner in which the helical positioning of the cutting blades about the cutter shaft aids in the downward movement of loosed materials from the reclaimable pile 49 is shown in FIGURE 5. Due to the helical positioning of the cutting blades about the shaft 27a, a first or lower blade will cut a path in the surface of the pile 49 designated by the rectangular section 64. This will leave a recessed region or groove in the vertical wall of the pile 49 such that when the following blade rotates into position, a second slice will be achieved as indicated by the rectangular section 65. However, by the time the slice 65 is taken in the wall of the pile 49, the immediately adjacen lower blade will have moved away from the cut path 64 allowing a space for the material loosed by the cutting action at the rectangular section 65 to drop into the groove 64 and into a succession of grooves beneath the groove 64 which have been cut by the helical cutting action of the blades 55. Therefore, the cutting action along a given wall of the pile 49 will be from the lower portion of the wall upward along the sloper cutter in the manner indicated by the cuts 64 and 65. For instance, a rectangular section of material 66 directly above the section 65 will be cut by a succeeding cutter blade directly following the cut indicated at 65. This material will then fall into the two lower grooves 65 and 64. In this way, continuous cutting action is maintained, while downward progression of the loosed material is uninhibited.

The connection of the drive shaft 30 and of the linkages 32 and 33 is shown in FIGURE 7. In particular, FIGURE 7 illustrates the fact that the drive shaft 30 and the linkage 32 is maintained substantially parallel to the pivot points 28 and 29 of the supporting boom 27. It should be remembered that the universal joint connector 34 is positioned fixedly relative to the reclaimer frame 20. Also, the drive shaft 30 and the sloper 26 are supported by the boom 27. Since the boom 27 must pivot about the points 28 and 29 in order to adjust to the size and orientation of the cutting surface of the pile 49, it is desirable that maximum angular movement of the boom 27 be permitted within the limitations of the universal joint connections of the linkages 32 and 33. Such movement is maximized in FIGURE 7 by positioning the linkage 32 and the drive shaft 30 substantially parallel to the orientation of the pivot points 28 and 29. In this way, sufficient pivotal movement of the boom and sloper system is accomplished while using the relatively simple universal joint connections.

FIGURE 8 shows the pivotal connection structure used for the boom at the points 28 and 29. Essentially, the pivotal connection consists of a spherical surface 68 which is maintained between flanges 69 and 70 of the reclaimer frame 20 and which is held in position by a pin 71. The leg 72 of the boom 27 makes the connection with the flanges 69 and 70 of the main frame 20 through a supporting stud 71a which has an internal spherical surface 73 cooperable with the bearing 68 for being rotatably movable thereabout. Through this connection, substantial loading in the direction transverse to the normal pivotal movement of the leg 72 is sustained.

FIGURE 9 shows the cutting shaft 27a in the form of a series of shaft segments 74, 75 and 76 which may be assembled to develop a cutting shaft of suitable length appropriate for the task to be undertaken. The shaft segments may be joined as at points 77, 78 and 79.

FIGURE 10 shows two segments of the cutter shaft 27a which are joined as at one of the points 77, 78 or 79. Generally the hollow shaft segment 80 is provided with a connector plug 81 which is welded or the like at points 82 and 83 to the interior of the shaft 80. The outermost end of the plug 81 is provided with a splined surface 84. The surface 84 is formed about a radially reduced portion 85 of the plug 81 such that a shoulder 86 results. The shaft section 86a has an internal spline surface 87 cooperable with the spline 84 for transferring torque therebetween. Also, the shaft section 86a has a sleeve portion 89 which is caused to abut the collar or seat 86 of the plug 81. The longitudinal orientation of the shaft segments 80 and 86a is fixed by a series of screws 90.

The entire assembled cutter shaft 27a is supported at the boom 27 by first and second support arms 91 and 92. The arms 91 and 92 are riveted as at 93 and 94 to an outer racer 95 of a bearing 96. The bearing 96 is disposed between the sleeve portion 89 and the racer 95 such that the cutter shaft 27a is caused to rotate freely within the shaft supports 91 and 92. By spacing such cutting shaft supports longitudinally along the length of the boom 27, the cutting torque produced at the shaft 27a is transferred to the boom 27 and therefrom to the pivot points 28 and 29 where the torque is sustained by the main frame 20.

It also should be noted in reference to FIGURES 9 and 10 that the cutting torque is oriented nearly wholly in a plane perpendicular to the longitudinal direction of the shaft. This is due principally to the fact that the cutting edges 59 of the blades 55 are disposed longitudinally of the shaft, and, therefore, the cutting action does not produce forces which would tend to separate the shaft segments as in the case of the segments 74, 75 and 76. It can be seen from FIGURE 10, therefore, that the cutting torque is sustained nearly entirely by the splined surfaces 84 and 87, and only a minimal force, as indicated by the nature of the screws 90, is required to maintain the longitudinal positioning of the shaft segments 80 and 86.

It will be understood that various modifications of the embodiments disclosed in this invention can be accomplished by those skilled in the art.

I claim as my invention:

1. A material handling machine comprising:
   a mobile supporting frame,
   a digging wheel mounted on said frame,
   a conveyor operably disposed on said frame transversely of said digging wheel for moving reclaimed materials to a loading vessel,
   a sloper mounted on said frame extended from one side of said digging wheel for causing materials to be deposited directly onto said conveyor,
      said sloper having an upwardly angled shaft and a plurality of cutting blades disposed longitudinally thereon for engaging an available surface of a pile of reclaimable material, and
   means for rotating said blades and generating a cutting action along said shaft.

2. A material handling device as described in claim 1 wherein said cutting blades are substantially rigidly mounted on said shaft, said cutting blades having a cutting edge spaced radially outwardly of said shaft and orientated longitudinally thereof, whereby rotation of said shaft generates an outward arcuate movement of said cutting edge for slicing a layer of material from the surface of a pile of reclaimable material.

3. A material handling device as described in claim 2 wherein successive discrete cutting blades are angularly spaced about the perimeter of said shaft such that said cutting edges define a substantial helix along the length thereof.

4. A material handling device as described in claim 1 wherein said cutting blades comprise:
   a plurality of discrete blade supports extending radially from said shaft,
      said blade supports being spaced longitudinally along said shaft and successive blade supports spaced at a continuously increasing angle about the perimeter of said shaft from one end to the opposite end thereof,
   a chisel-like blade member secured to each of said blade supports and forming a substantial angle therewith such that rotation of said shaft develops a chisel-like motion to said blades,
whereby the angular spacing of said blades causes a successive cutting action along the length of said sloper for generating a free downward movement of material cut from the surface of a pile of reclaimable material.

5. A material handling device as described in claim 4 wherein each of said cutting blades has a cutting edge disposed radially outwardly from said shaft and wherein all points on said cutting blade are disposed radially inwardly of said cutting edge.

6. A material handling device as described in claim 4 wherein successive cutting edges of said cutting blades are angularly displaced at approximately 100° about the perimeter of said shaft and wherein each of said blades cuts an arcuate path which overlies the cutting path of an adjacent cutting blade.

7. A material handling device as described in claim 4 wherein means are provided for moving said device longitudinally along the face of a pile of reclaimable material and for simultaneously rotating said sloper shaft such that said cutting blades are caused to move in a substantially cycloidal path relative to the material being loosed.

8. A material handling machine comprising:
   a mobile supporting frame,
   a digging wheel mounted on said frame,
   a conveyor operably disposed on said frame for moving reclaimed materials to a loading vessel,
   a boom pivotally mounted at said frame for being angularly adjusted relative to a pile of reclaimable material,
   a sloper carried by said boom at one side of said digging wheel and having rotatably mounted cutting blades for cutting the surface of a pile of reclaimable material and for depositing cut material directly onto said conveyor,
   said cutting blades forming a discontinuous substantially helical cutting edge along the length of said sloper, and
   means for rotating said cutting blades and means for moving said supporting frame along the surface of a pile of reclaimable material.

9. A material handling device as described in claim 8 wherein said sloper cutter is disposed at the leading edge of said boom and wherein a dam is formed at the trailing edge thereof for forming a trough between a cut edge of a pile of reclaimable material and said dam to confine the flow of material to said conveyor.

10. A material handling device as described in claim 8 wherein a drive shaft extends to said sloper cutter from a universal joint support and wherein said drive shaft is orientated substantially parallel to the pivot points of said pivotally mounted boom, whereby movement of said boom is maximized relative to the angular movement provided by said universal joint supported drive shaft.

11. A material handling machine comprising:
 a mobile supporting frame,
 a digging wheel mounted on said frame,
 a digging auger mounted on said frame and rotating in a direction to move material into the digging wheel,
 a conveyor operably disposed on said frame transversely of said digging wheel for moving reclaimed materials to a loading vessel,
 said conveyor having one end extended into the interior of the digging wheel for receiving materials unloaded from the digging wheel and for transporting the material to an opposite side of said frame for depositing in a loading vessel,
 a sloper mounted on said frame extended from one side of said digging wheel for causing materials to be deposited directly onto said conveyor,
 said sloper having an upwardly angled shaft and a plurality of cutting blades disposed longitudinally thereon for engaging an available surface of a pile of reclaimable material, and
 means for rotating said blades and generating a cutting action along said shaft.

12. A material handling device as described in claim 11 wherein said cutting blades comprise:
 a plurality of discrete blade supports extending radially from said shaft,
  said blade supports being spaced longitudinally along said shaft and successive blade supports spaced at a continuously increasing angle about the perimeter of said shaft from one end to the opposite end thereof,
 a chisel-like blade member secured to each of said blade supports and forming a substantial angle therewith such that rotation of said shaft develops a chisel-like motion to said blades.

13. A material handling device as described in claim 11 wherein each of said cutting blades has a cutting edge disposed radially outwardly from said shaft and wherein all points on said cutting blade are disposed radially inwardly of said cutting edge, whereby said cutting blade allows clearance for the rotating cutting edge.

14. A material handling machine comprising:
 a mobile supporting frame including means for moving the machine alongside a pile of reclaimable material,
 a digging wheel mounted on said frame,
 a digging auger mounted on said frame and rotating in a direction to move material into the digging wheel, a conveyor operably disposed on said frame transversely of said digging wheel for moving reclaimed materials to a loading vessel,
 a boom pivotally mounted at said frame,
 a sloper carried by said boom and extending from one side of said digging wheel for causing materials to be deposited directly onto said conveyor,
 said sloper having an upwardly angled shaft and a plurality of cutting blades disposed longitudinally thereon for engaging an available surface of a pile of reclaimable material, and
 means for rotating said blades and generating a cutting action along said shaft.

15. A material handling device as described in claim 14 wherein said sloper cutter is disposed at the leading edge of said boom and wherein a dam is formed at the trailing edge thereof for forming a trough between a cut edge of a pile of reclaimable material and said dam to confine the flow of material to said conveyor.

16. A material handling device as described in claim 15 wherein said sloper is disposed substantially transversely of said digging wheel and wherein a drive shaft extends to said sloper cutter from a universal joint support and wherein said drive shaft is orientated substantially parallel to the pivot points of said pivotally mounted boom, whereby movement of said boom is maximized relative to the angular movement provided by said universal joint supported drive shaft.

17. A material handling machine comprising:
 a mobile supporting frame,
 a digging wheel mounted on said frame,
 a conveyor operably disposed on said frame transversely of said digging wheel for moving reclaimed materials to a loading vessel,
 a sloper mounted on said frame extended from one side of said digging wheel for causing materials to be deposited directly onto said conveyor,
 said sloper having an upwardly angled shaft and a plurality of cutting blades disposed longitudinally thereon for engaging an available surface of a pile of reclaimable material,
 means for rotating said blades and generating a cutting action along said shaft, and
 a sloper drive mechanism mounted on said frame, at least one drive linkage pivotally interconnecting said drive mechanism and said sloper,
 said linkage being disposed substantially parallel to the pivotal axis of said boom for intermeidate positioning of said sloper.

18. A material handling machine as described in claim 17 wherein said sloper is maintained along the length of said boom and spaced therefrom by a series of collar bearings supported thereon, wherein a shaft segment is supported by said boom and extends to said sloper at a fixed angle and wherein said parallel linkage has a first universal joint connection to said shaft at said boom and a second universal joint connection to said drive mechanism.

19. A material handling machine comprising:
 a mobile supporting frame,
 a digging wheel mounted on said frame,
 a conveyor operably disposed on said frame transversely of said digging wheel for moving reclaimed material to a loading vessel,
 a sloper mounted on said frame extended from one side of said digging wheel for causing materials to be deposited directly onto said conveyor,
 said sloper having an upwardly angled shaft and a plurality of cutting blades disposed longitudinally thereon for engaging an available surface of a pile of reclaimable material,
 means for rotating said blades and generating a cutting action along said shaft, and
 drive means mounted on said frame and a series of linkages having interconnecting universal joints extending from said drive means to said sloper,
 one of said linkages extending substantially parallel to the pivotal axis of said boom for maximizing the angular movement of said sloper.

20. A material handling machine comprising:
 a mobile supporting frame,
 a digging wheel mounted on said frame,
 a conveyor operably disposed on said frame transversely of said digging wheel for moving reclaimed materials to a loading vessel,
 a boom pivotally mounted at said frame for being angularly adjusted relative to a pile of reclaimable material, a sloper carried by said boom and extended from one side of said digging wheel for causing materials to be deposited directly onto said conveyor,
said sloper having an upwardly angled shaft and a plurality of cutting blades disposed longitudinally thereon for engaging an available surface of a pile of reclaimable material,
means for rotating said blades and generating a cutting action along said shaft,
a sloper drive mechanism mounted on said mobile supporting frame,
series-connected linkages having interconnecting universal joints and extending from said drive mechanism to said sloper and rotating said sloper in response to rotation of said drive,
one of said linkages extending from a point fixed relative to said supporting frame to said sloper and being orientated substantially parallel to the pivotal axis of said boom.

21. A material handling device as described in claim 20 wherein a shaft segment extends at a fixed angle from said sloper to said boom and wherein said parallel linkage extends from said shaft segment at said boom to said point fixed relative to said supporting frame.

22. A material handling machine comprising:
a mobile supporting frame,
a digging wheel mounted on said frame,
a conveyor operably disposed on said frame transversely of said digging wheel for moving reclaimed materials to a loading vesel,
a boom pivotally mounted at said frame for being angularly adjusted relative to a pile of reclaimable material,
a sloper carried by said boom and having rotatably mounted cutting blades for cutting the surface of a pile of reclaimable material and for depositing cut material onto said conveyor,
means for rotating said cutting blades and for moving said supporting frame along the surface of a pile of reclaimable material,
said sloper cutter being disposed at the leading edge of said boom and wherein a dam is formed at the trailing edge thereof for forming a trough between a cut edge of a pile of reclaimable material and said dam to confine the flow of material to said conveyor.

23. A material handling machine comprising:
a mobile supporting frame,
a digging wheel mounted on said frame,
a conveyor operably disposed on said frame transversely of said digging wheel for moving reclaimed materials to a loading vessel,
a boom pivotally mounted at said frame for being angularly adjusted relative to a pile of reclaimable material,
a sloper carried by said boom and having rotatably mounted cutting blades for cutting the surface of a pile of reclaimable material and for depositing cut material onto said conveyor,
means for rotating said cutting blades and for moving said supporting frame along the surface of a pile of reclaimable material,
said sloper cutter being disposed at the leading edge of said boom and with a lower end of the cutter generally aligned with a leading edge of the conveyor to enable ready deposition of cut materials onto the conveyor during forward movement of the machine.

References Cited

UNITED STATES PATENTS

| | | | |
|---|---|---|---|
| 517,726 | 4/1894 | Braun | 37—190 |
| 2,104,928 | 1/1938 | Jacobs | 37—190 |
| 2,675,116 | 4/1954 | Collins | 198—9 |
| 2,896,342 | 7/1959 | Reising | 37—97 |

FOREIGN PATENTS

| | | |
|---|---|---|
| 599,037 | 10/1925 | France. |
| 324,561 | 8/1920 | Germany. |
| 1,175,157 | 7/1964 | Germany. |

GERALD M. FORLENZA, Primary Examiner

F. E. WERNER, Assistant Examiner

U.S. Cl. X.R.

37—190; 198—9; 214—10

UNITED STATES PATENT OFFICE
CERTIFICATE OF CORRECTION

Patent No. 3,500,988     Dated March 17, 1970

Inventor(s) Fred T. Smith

It is certified that error appears in the above-identified patent and that said Letters Patent are hereby corrected as shown below:

Column 4, line 47, "adjacen" should read -- adjacent --

Column 9, line 11, after "frame," insert --and--;
         line 30, "vesel" should read --vessel--;
         line 37, after "conveyor," insert --and--.

Column 10, line 15, after "conveyor," insert --and--.

SIGNED AND
SEALED
SEP 15 1970

(SEAL)
Attest:

Edward M. Fletcher, Jr.
Attesting Officer

WILLIAM E. SCHUYLER, JR.
Commissioner of Patents